(12) United States Patent
Luo et al.

(10) Patent No.: US 6,542,826 B2
(45) Date of Patent: Apr. 1, 2003

(54) BT SORTING METHOD AND APPARATUS FOR LARGE VOLUMES OF SEISMIC DATA

(75) Inventors: Yi Luo, Dhahran (SA); Mohammad Huwaidi, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 84 days.

(21) Appl. No.: 09/879,702

(22) Filed: Jun. 11, 2001

(65) Prior Publication Data

US 2002/0188405 A1 Dec. 12, 2002

(51) Int. Cl.[7] ................................................ G01V 1/28
(52) U.S. Cl. ........................................................ 702/14
(58) Field of Search .............................. 702/14, 16, 18; 367/73

(56) References Cited

U.S. PATENT DOCUMENTS 6,226,601 B1 * 5/2001 Longaker ..................... 702/14

* cited by examiner

Primary Examiner—Donald E. McElheny, Jr.
(74) Attorney, Agent, or Firm—Abelman, FRayne, & Schwab

(57) ABSTRACT

A method for sorting large volumes of seismic data portions into a defined order. The data portions are allocated to leaf files of a B-Tree structure and stored in a corresponding scratch memory space corresponding to the allocated leaf file. A full leaf file is read out into a sorting memory space wherein it is sorted into a respective sub-order. All the sorted data portions are output in the respective sub-orders for all the full leaf files in leaf order to a final output data stream, where the data portions in their respective sub-orders for all the full leaf files in leaf order are in the defined overall order.

22 Claims, 7 Drawing Sheets

BT SORTING METHOD AND APPARATUS FOR LARGE VOLUMES OF SEISMIC DATA

FIELD OF THE INVENTION

This invention relates to the sorting of large volumes of seismic data economically both as to time and as to hardware.

BACKGROUND OF THE INVENTION

In the processing of seismic data, particularly in the oil field industry, the sheer quantity of data to be processed has increased very rapidly. For example, for 3-dimensional (3D) imaging, the channel count has already reached 3840 channels per Vibrosize position, yielding data sets today on the order of 1 to 2 terabytes ($10^{12}$) or larger. Data sets of this size are easily built by 500 million traces, and the desired data set size is only expected to grow.

A necessary initial step in the processing for many seismic processing algorithms is sorting the seismic data into a special order, such as common mid-point or common receiver gathers. In general, when using a heap-sort algorithm for trace data, one may calculate the complexity (the number of operations) associated with the task to be $N*lnN$, where N is the number of traces. For the example of 500 million traces, this requires:

$$500*10^6*ln500*10^6 = \text{about 15.5 billion operations.}$$

In practice this estimation is misleading because it requires that the whole amount of data reside in memory in a stand-alone computer system, and most systems cannot hold this amount of data in memory. Indeed, even though it is well known that the advancement of computer hardware is leap-frogging in regards to speed, volume and reliability, the improvements in hardware are as yet insufficient to meet the needs of current seismic data processing. The increase in channel count and multiplicity of 3D data and the need to apply advanced processing methods, such as pre-stack time/depth migration, require innovative data handling methods. Quick sorting is one of the key factors for the efficient execution of these advanced algorithms.

The seismic industry has long been aware of the need for a sorting method efficient enough to handle the increasingly large quantities of data, but to date the methods in use have been inadequate.

The two basic sorting methods in use today are memory-based sorting and disk-based sorting. Memory-based sorting reads and accumulates traces in memory. After all the traces have been read in, or a certain criterion is satisfied, output traces are produced in the desired order. A typical criterion is a pre-defined window size, which could be the minimum number of traces needed to be held in memory and/or scratch disks. This method will not work when the data volume or the window size is larger than the memory capacity. Moreover, this method is not robust because traces can be lost when the actual window size in the input data set is larger than the user-pre-defined window size.

Disk-based sorting, the second conventional method, keeps the data in a limited memory buffer before writing it to temporary scratch disk files. The traces in the buffer can be partially sorted before being written to disk. After all the data has been written into hard disk(s), it can be read back in the desired sorted order and output to the final disk file(s). In this method, random access to the traces is usually needed, which is relatively slow. Moreover, this method may require as large a scratch disk space as the entire input data set. This is disadvantageous or impossible for sorting the large 3D seismic data sets in the range of tera-bytes discussed above.

Besides the two basic methods described above, hybrid methods combining aspects of the two basic methods have been proposed that reduce utilization of scratch space and CPU time. However, a simple combination of the two basic methods does not produce an acceptable method that works well for sorting large input data sets because the fundamental problems for each of the two basic methods remain unresolved.

Thus, for large volumes of seismic data, sorting is a serious task in terms of human and computer resources. Most systems cannot hold the entire input data in memory, and the conventionally available methods take an inordinate amount of time to process a data set of the desired size. For example, even using a hybrid of the two basic methods, it has taken the applicants 6–8 weeks to have 1.2 tera-byte data sorted. Accordingly, an improved sorting scheme is needed.

SUMMARY OF THE INVENTION

It is therefore an object of the present invention to provide a method and apparatus for sorting large quantities of seismic data that avoid the above-described difficulties of the prior art.

It is a further object of the present invention to provide a method and apparatus that sort large quantities of seismic data in times on the order of no more than days, rather than weeks.

The above and other objects are achieved by the present invention which, in one embodiment, is directed to a method for sorting large volumes of seismic data into a defined order. The method includes a receiving step of receiving one of a plurality of data portions, where the plurality of data portions constitute an input data set, each data portion containing a plurality of seismic data and having associated therewith an index distinguishing the respective data portion from all other data portions in the input data set. The method further includes an allocating step of allocating the received data portion to one of a plurality of leaf files of a B-Tree structure, the B-Tree structure defining a leaf order of the leaf files, a first storing step of storing the allocated data portion in a scratch memory space corresponding to the allocated leaf file, and a first repeating step of repeating the receiving step, the allocating step and the first storing step until the next one of the leaf files in the leaf index order is full.

The method still further comprises a reading step of reading a full one of the leaf files from the scratch memory space, a second storing step of storing data portions of the read leaf file into a sorting memory space, a sorting step of sorting the data portions in the sorting memory space into a respective sub-order based upon the indices of the data portions therein, and a step of selectively repeating the reading step, the second storing step and the sorting step until all the data portions of the read leaf file have been sorted.

Finally, the method comprises an outputting step of outputting the sorted data portions of the read leaf file in their sub-order to a final output data stream, and a second repeating step of repeating at least the reading step, the second storing step, the sorting step and the outputting step until all the data portions of the input data set have been outputted in the respective sub-orders for all the full leaf files in leaf order to the final output data stream, where the data portions in their respective sub-orders for all the full leaf files in leaf order are in the defined overall order.

In a preferred embodiment, each data portion is a seismic data trace, and each allocated data portion is stored in a scratch disk memory.

These and other objects, features and advantages of the present invention will be apparent from the following detailed description of the preferred embodiments taken in conjunction with the following drawings, wherein like reference numerals denote like elements.

DETAILED DESCRIPTION OF THE PREFERRED EMBODIMENTS

The present invention is based upon a development of a conventional sorting method known as the Bayer-balanced tree method, hereinafter referred to as the B-Tree method. See Miller, *File Structures Using Pascal*, Benjamin/Cummings, Menlow Park, Calif., USA (1987); Corman et al., *Introduction to Algorithm*, MIT Press, Mass., USA (1992). The B-Tree concept was formulated for storing and searching large data sets stored on disks for minimizing disk input/output (I/O). This is attainable when data is organized in a special manner to allow fast operations. B-Tree structure is usually found embedded in Database Management Systems.

Figure 1:
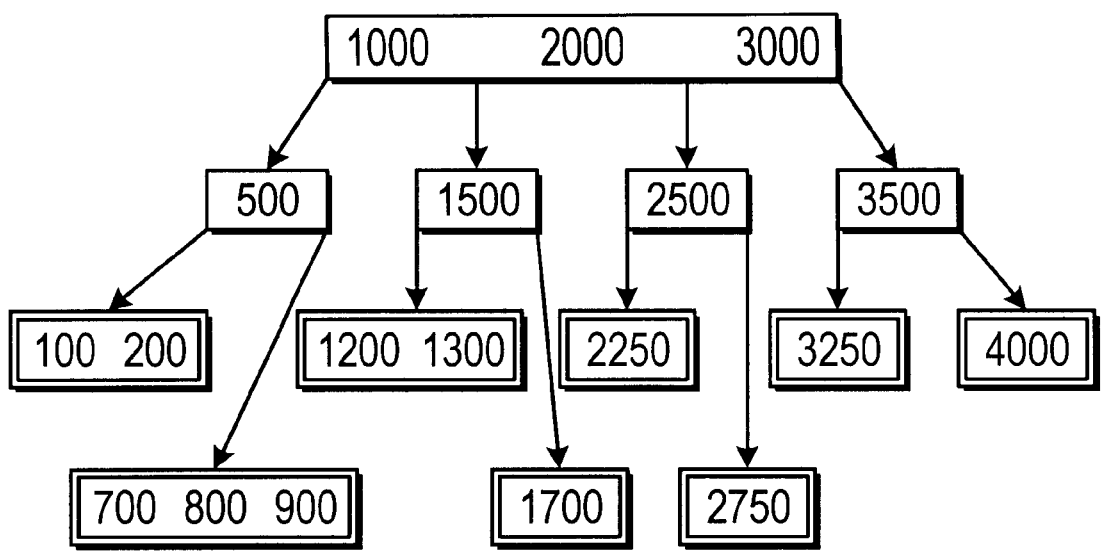
FIG. 1 is a sorting diagram for a prior art sorting method used in a database management system.

FIG. 1 presents a simple case of a B-Tree structure 10, representing data having values 1–4000. Here, the main tree 12 has four nodes 14, 16, 18, 20. Each node in turn has two leaves, i.e. leaf files. Thus, node 14 has leaves 22, 24, node 16 has leaves 26, 28, node 18 has leaves 30, 32 and node 20 has leaves 34, 36. In a B-Tree, any given node value is larger than that of any left descendant/sibling and smaller than that of any right descendant/sibling. For example, the value of node 16 is 1500, indicating a dividing point. The value 1500 is larger than the values of left sibling node 14 (500) and left descendant leaves 22, 24, 26 (100–1300). Similarly, the value 1500 is smaller than the values of right sibling nodes 18, 20 (2500, 3500) and right descendant leaves 28–36 (1700–4000).

Thus, parsing a B-Tree is simple, and sorting through systematic parsing is known to be both relatively easy and relatively cheap. The method and apparatus of the present invention take advantage of this structure to provide an efficient sorting of seismic data unavailable in the prior art.

Figure 2:
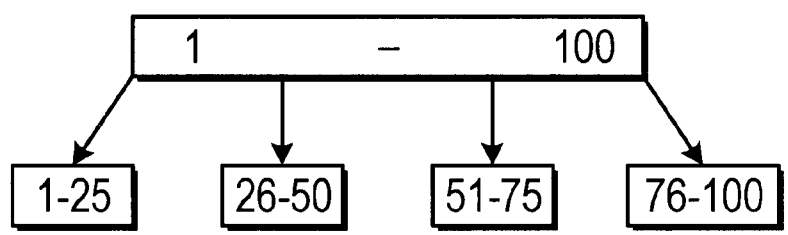
FIG. 2 is a sorting diagram for a method in accordance with an embodiment of the present invention.

FIG. 2 illustrates an advantageous B-Tree structure 100 usable in a method in accordance with an embodiment of the invention. It is assumed for the purposes of this example that the CMP indices of the traces in the input data range from 1 to 100. B-Tree 100 includes a main file 102 and four leaf files 104, 106, 108, 110. Desirably, leaf file 104 will hold the traces with CMP indices 1–25, leaf file 106 will hold the traces with CMP indices 26–50, leaf file 108 will hold the traces with CMP indices 51–75 and leaf file 110 will hold the traces with CMP indices 76–100.

Thus, B-Tree 100 has leaf files in a defined leaf order. In accordance with the present invention, each leaf file holds data portions (traces) which will present the entire data set in a desired order when the data portions are ordered and the leaf files are considered in leaf order. In the embodiment of the present invention under discussion, where the defined overall order after sorting is desired to be ascending order, the data in each leaf file after sorting will be in an ascending sub-order. Accordingly, when the data has been sorted into the defined sub-order within each leaf file and then the leaf files are considered in leaf order, the data of the entire input data set is in the defined overall order.

Figure 3:
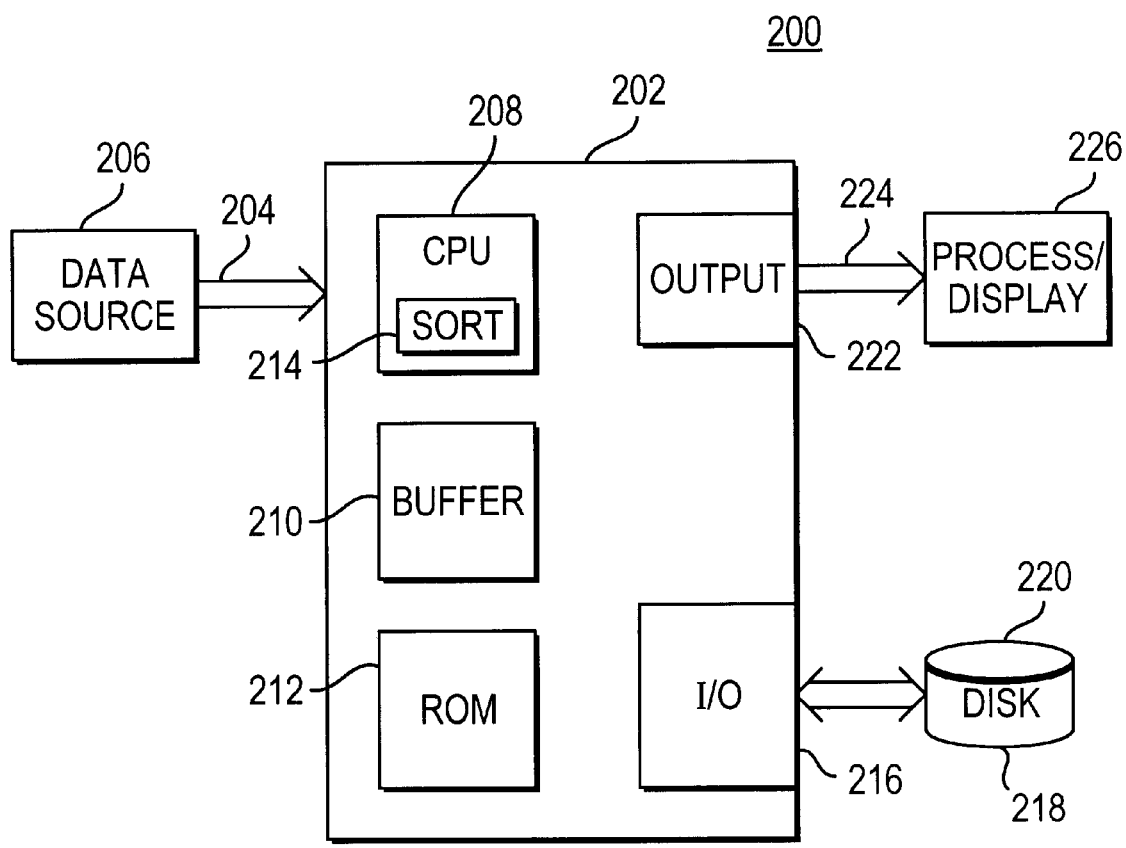
FIG. 3 is a block diagram of apparatus in accordance with an embodiment of the present invention.
Figure 4:
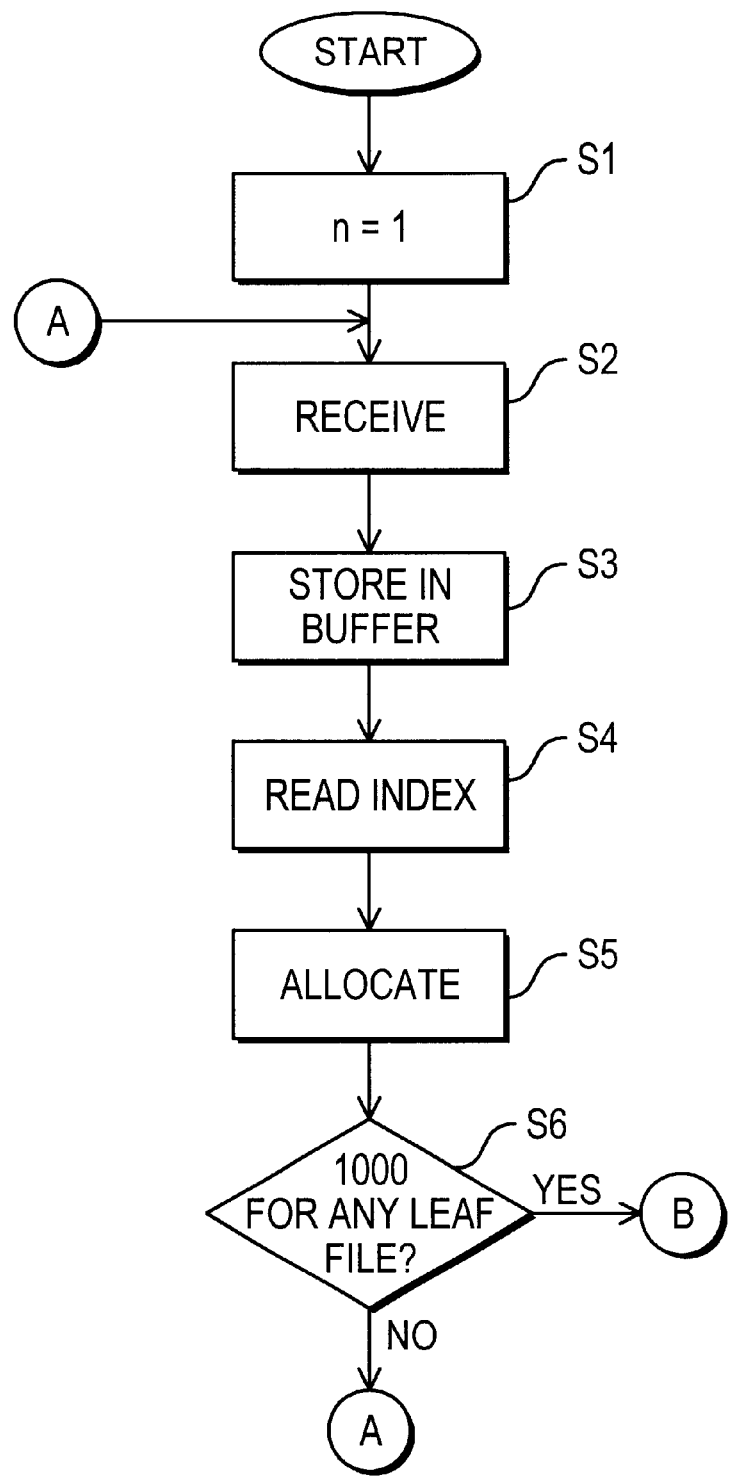
FIGS. 4–7 illustrate a flowchart of a method in accordance with an embodiment of the present invention using the sorting diagram of FIG. 2.

FIG. 3 schematically illustrates an embodiment of an apparatus for carrying out the present invention. As shown therein, the apparatus 200 includes a workstation 202 receiving seismic trace data 204 in the form of traces (data portions) one at a time in arbitrary CMP order from a data source 206, e.g. the seismic detector phones in the field. Workstation 202 includes a CPU 208 for controlling the operation of the workstation 202 in carrying out the method of the present invention, random access memory (RAM) acting as a buffer memory 210 and read-only memory (ROM) 212 for storing the control programs and operating data for the CPU 208. In particular, the workstation 202 stores a sorting algorithm 214, for example in the CPU 208, for sorting the trace data in accordance with the present invention.

The workstation 202 also includes an I/O device 216 for outputting trace data 204 to a disk file apparatus 218 and for inputting the trace data 204 back to the workstation 202. Disk file apparatus 218 includes at least one scratch disk 220 on which the leaf files 104–110 may be written. As noted below, disk file apparatus 218 need not be written for random access reading. Finally, the workstation 202 includes an output device 222 for outputting the sorted trace data as an output final data stream 224 to another device 226 where further processing or display might occur.

Utilizing the B-Tree 100 structure with the apparatus of FIG. 3, a preferred embodiment of the present invention processes the data as follows.

It is assumed that the input trace data 204 from the input device 206 is received by the workstation 202 in an arbitrary order with the CMP indices ranging from 1–100, and it is desired to sort the traces into ascending-ordered CMP gathers. When the CPU 208 operating under the sorting algorithm 214 gets an input trace with CMP index #X in the input trace data 204, it allocates the trace #X to the leaf file where the input CMP index belongs and writes the allocated trace therein. For example, an input trace with CMP index 24 would be written into leaf file 104. Accordingly, the CPU 208 would allocate and write the trace #24 through the I/O device 216 onto the scratch disk 220 in disk file apparatus 218 for leaf file 104. Similarly, if an input trace with CMP index 55 is received, the CPU 208 would allocate and write this trace #55 through the I/O device 216 onto the scratch disk 220 in disk file apparatus 218 for leaf file 108. Other traces, having other CMP indices, would similarly be allocated and written onto the scratch disk 220, or onto another scratch disk, for the appropriate leaf file.

Advantageously, a number of traces could be temporarily stored in the buffer memory 210, or another memory, of the workstation 202 before being written as a batch onto the scratch disk 220 for the appropriate leaf files. For example, if 500 million total traces are expected for the entire input data set, 1000 traces might be accumulated in buffer memory 210.

When a leaf file is "full," the data of the traces therein is read back from the scratch disk 220 into the buffer memory 210 or another memory for sorting into ascending order by the sorting algorithm 214. After sorting, the sorted traces of the leaf file are output as the final output data stream 224 and to the other device 226, as desired. Alternatively, the sorted traces could be stored again in memory, for example in the disk file device 220, in the workstation 202 or elsewhere, as a final output file until it is desired to process the data further.

As used in the present invention, a leaf file is considered to be "full" only when two conditions are met simultaneously. First, no more input traces are available to fall into this leaf file, e.g. the end of the input data has been reached or the window size has been exceeded. Second, all the leaf files to the left of the subject leaf file in the B-Tree must have already been sorted and output to the final file/data stream. For example, if the subject leaf file is leaf file 106, it can be considered full only if leaf file 104 has already been output, while if the subject leaf file is leaf file 108, it can be considered full only if leaf files 104 and 106 have already both been output. It will be noted a leaf file can be full even if higher order leaf files are not full. For example, if all the traces with CMP indices 1–25 are received first, leaf file 104 can be full even before all the other traces are received. In accordance with these conditions, it is assured that the traces in the final file/data stream will appear in the correct ascending order.

A further advantage of the present invention is that if the leaf files are small enough, the traces therein do not have to be read from the scratch disk 220 in the required output order, since the entire leaf file can be read into the buffer memory 210 (or other available memory). The small leaf file size can be achieved by increasing the number of leaf files. Reading the files as they are stored on disks can avoid the need for random access to the data. This provides improvements both in the speed of sorting and in the cost of the hardware.

Indeed, even if the leaf file is larger than the memory size, it is still possible to avoid the need for random access by reading through the leaf file several times. For example, if the leaf file is twice the size of the buffer memory 210, then during the first sequential reading only the lower-numbered half of the traces are saved into the buffer memory 210, and during the second reading only the higher-numbered half of the traces are saved. Again, this provides improvements in speed and hardware cost.

By minimizing the need for random access to the stored traces on the scratch disk 220, the code of the sorting algorithm 214 runs more efficiently. Each leaf file can be saturated when the window size has been exceeded, and it is not necessary to store the entire input data set in the scratch disk(s), minimizing the usage of disk spaces. In particular, the window size needs to be pre-defined by users to minimize the disk usage. If the scratch disk space is not an issue, the window size can advantageously be set equal to or larger than the total number of input traces. For example, in practice, a user can include an analysis module into the flow prior to the sorting flow. The analysis module will use relatively little CPU time and memory, but it can get and provide the window size for the sorting algorithm 214.

Flowcharts for the above-described sorting process are illustrated in FIGS. 4–8. It will be understood that these flowcharts are by way of example, and certain of the steps need not be taken in the precise order shown, and some steps may be omitted or added as appropriate for the particular embodiment.

As shown in FIGS. 4–7, in step S1, a number n representing the order of the leaf file that will next become full is initialized, i.e. n is set to 1, representing the leftmost leaf file 104. In step S2, the workstation 202 receives trace #X from the input device 206. In step S3, the trace #X is stored in the buffer memory 210, in step S4 the CPU 202 reads the CMP index, and in step S5 the trace is allocated to the appropriate leaf file. In step S6, it is determined whether the contents of the buffer memory 210 should be stored on the scratch disk 220, e.g. whether 1000 traces for any leaf file are stored in the buffer memory 210. If the answer is no, the process returns to step S2 to receive another trace, while if the answer is yes, in step S7 the traces in the buffer memory 210 are stored on the scratch disk 220 in the respective allocated leaf files.

Figure 8:
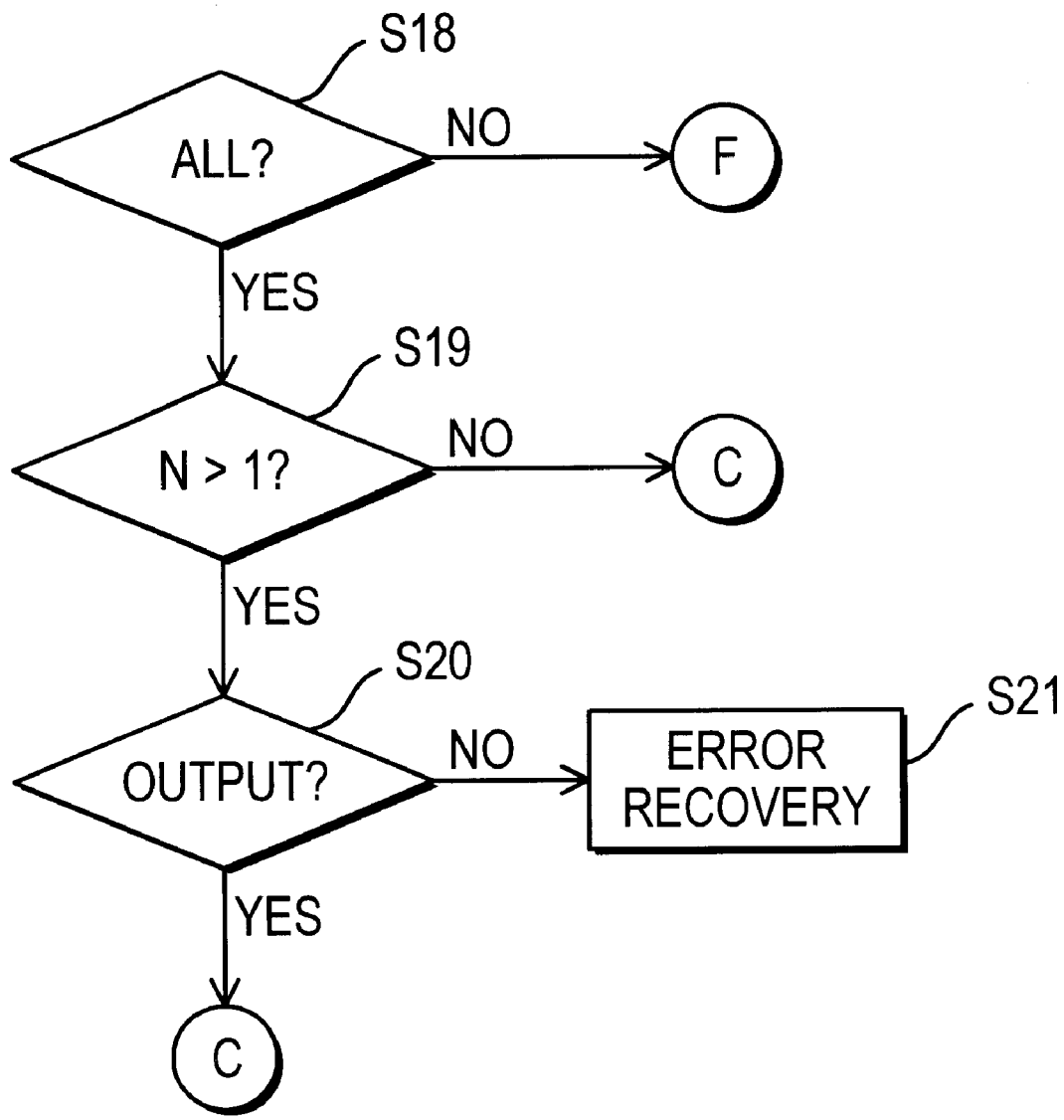
FIG. 8 illustrates a flowchart of a routine of one step in the flowchart of FIG.

When all the traces in the buffer memory 210 have been so stored, the process checks in step S8 whether leaf file n is full. This routine is shown in FIG. 8 and described below. If the answer in step S8 is no, in step S9 the process checks whether the end of the input data set has been reached and in step S10 whether the window size has been exceeded. If the answer in both steps S9 and S10 is no, the process returns to step S2 to receive the next trace. However, if the answer in any of steps S8–S10 is yes, the process goes to step S11 to begin the sorting (reordering) of the stored traces.

In step S11 the traces of leaf file n are read, advantageously without random access. In step S12 some or all of these traces are stored back into the buffer memory 210, depending on the size of the leaf file n compared with the buffer size. If only some of the traces can fit in the buffer memory 210, then in the first reading the group of lowest numbered traces are stored, while in subsequent readings the following groups are stored. In step S13, the traces in the buffer memory 210 are sorted into the desired order by CMP index, and in step S22 the ordered traces are output as the output data stream 224 for further processing.

In step S15, the process checks whether leaf file n has more traces to be sorted, and if the answer is yes, the process returns to step S11. If the answer is no, the leaf file number n is incremented in step S16.

Then in step S17 the process checks if all the leaf files have been sorted and output. If the answer is yes, the process ends. If the answer is no, the process returns to step S8 to see if there is another full leaf file ready to be sorted. Again, if no other leaf file is full and there is more data, the process returns to step S2.

The routine of step S8 in determining whether a leaf file is full will now be described. The routine begins in step S18, wherein the process checks first to see if all the traces for the current leaf file have been received. If the answer is no, the routine returns to the main process at step S9. If the answer is yes, in step S19 the routine checks whether there are any leaf files to the left of the current leaf file, i.e. whether n is greater than 1. If the answer is no, then the current leaf file 1 is full and the routine returns to the main process at step S11. If the answer is yes, in step S20 the routine checks that all leaf files to the left of the current leaf file have been sorted and output. If the answer is no, there has been an error, since n should not have been incremented unless all the leftward leaf files were output, and the process goes to an error recovery step S21. For example, the leaf file number might be reinitialized and all the traces read out again, or the presence of the error might be displayed for operator intervention. However, if the answer in step S20 is yes, then the current leaf file n is full and the routine returns to the main process at step S11.

Figure 5:
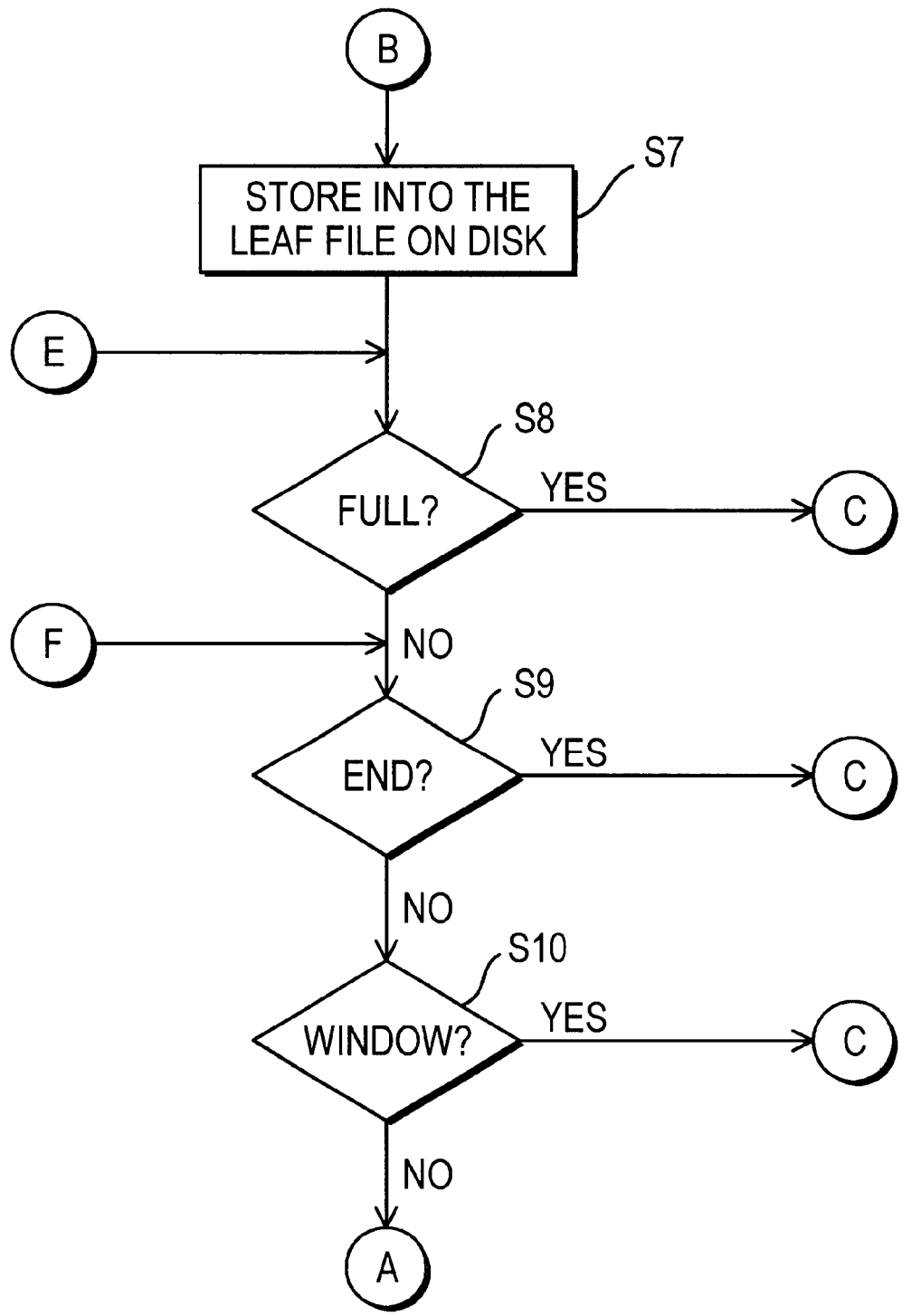
Figure 6:
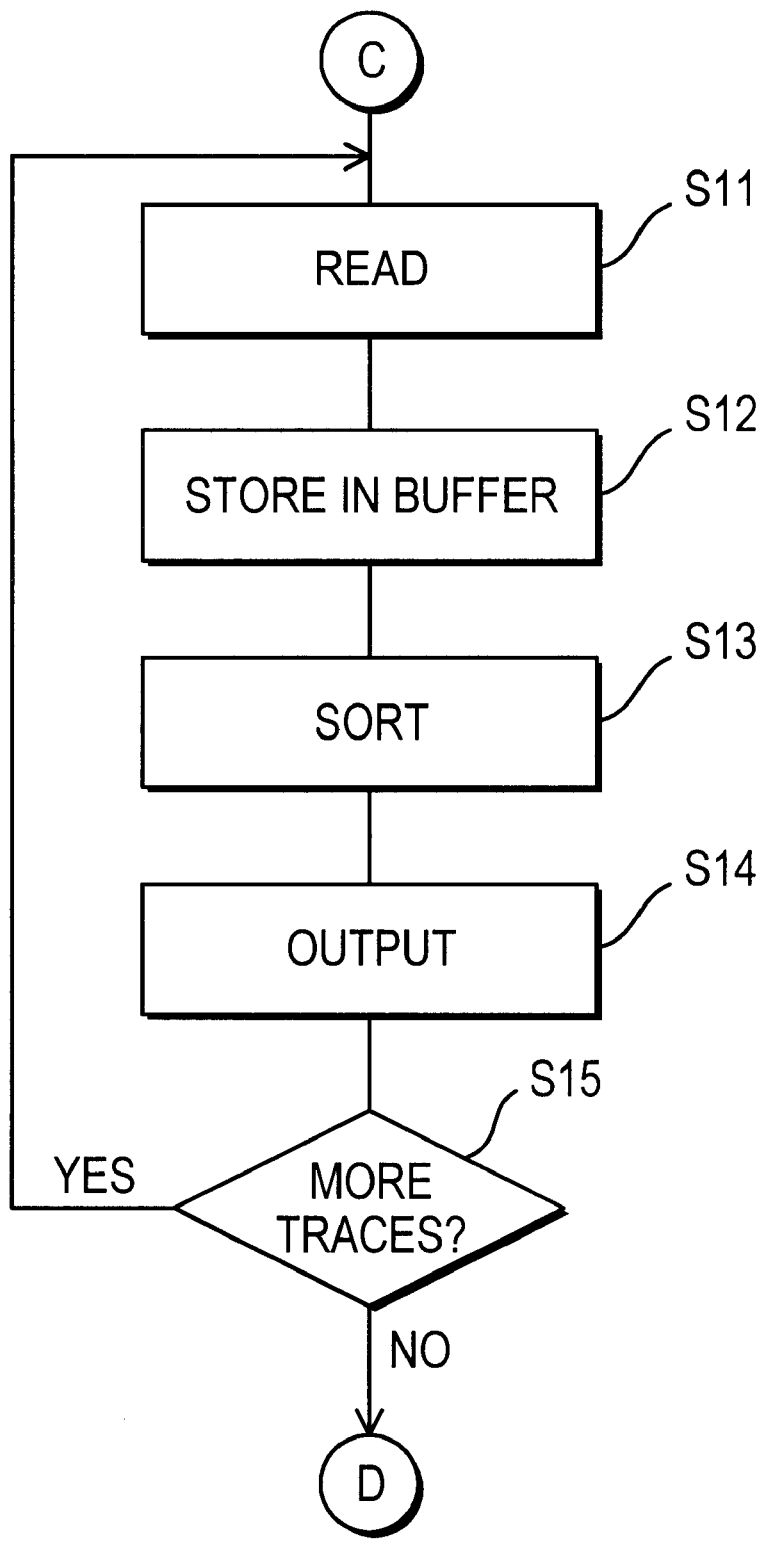
Figure 7:
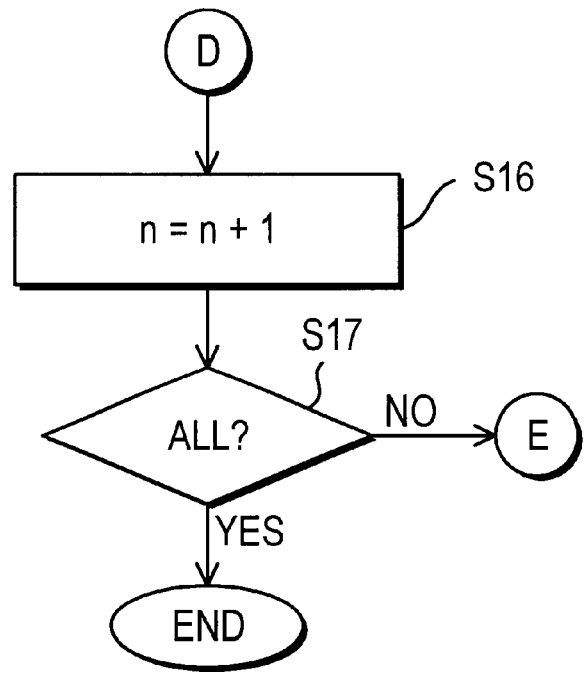
Figure 9:
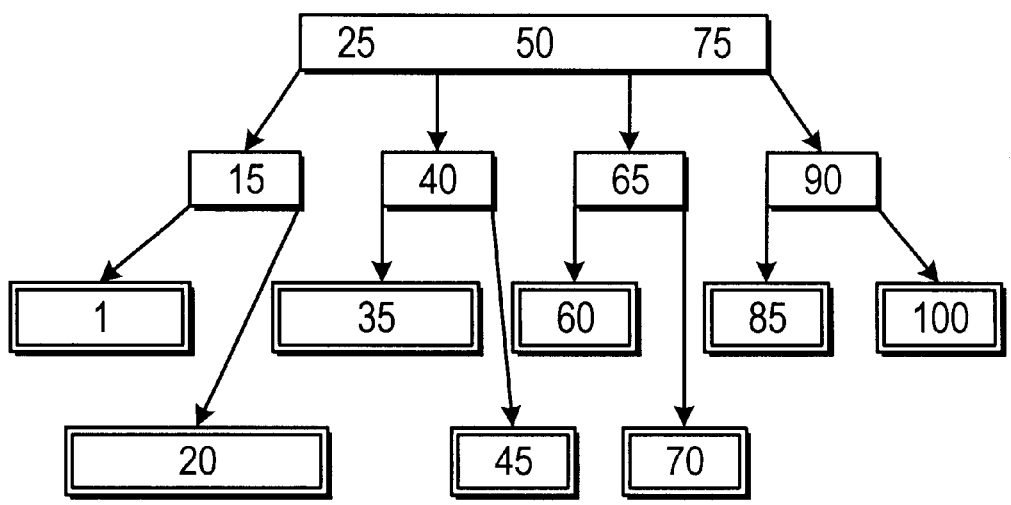
FIG. 9 is a sorting diagram for a method in accordance with another embodiment of the present invention.

It is usually preferable that the B-Tree structure be short vertically and fat horizontally, because this can yield many small, easily accessed leaf files, and therefore B-Tree 100 has been designed without nodes. However, with larger amounts of data or for different design objectives, the B-Tree structure used in other embodiments of the present invention may have any number of nodes and leaves as required. FIG. 5 illustrates an alternative B-Tree structure 300 for sorting data 1–100 in accordance with the method and apparatus of the present invention.

While the process has been described as using buffer memory 210 for storing the traces as they are input and again when they are being sorted, it will be apparent that one or both of these functions may use a different memory, either inside the workstation 202 or outside of it. Moreover, while the process has been described using a single workstation, it will be apparent that the sorting algorithm 214 can be run in parallel on plural workstations by distributing the load over various processors/nodes.

Furthermore, the example of sorting given above sorted the traces into ascending CMP order, but the present invention may be used to sort the data into any defined overall order. As achieved by the present invention, when the data has been sorted into a defined sub-order within each full leaf file and then the full leaf files are considered in leaf order, the data of the entire input data set is in the defined overall order.

Also, while the final output data stream has been illustrated as data stream 224, it will be understood that the final output data stream could flow to another memory within or outside of the workstation 202.

While the disclosed method and apparatus have been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A method for sorting large volumes of seismic data into a defined order, said method comprising:

a receiving step of receiving one of a plurality of data portions, where the plurality of data portions constitute an input data set, each data portion containing a plurality of seismic data and having associated therewith an index distinguishing the respective data portion from all other data portions in the input data set;

an allocating step of allocating the received data portion to one of a plurality of leaf files of a B-Tree structure, the B-Tree structure defining a leaf order of the leaf files;

a first storing step of storing the allocated data portion in a scratch memory space corresponding to the allocated leaf file;

a first repeating step of repeating said receiving step, said allocating step and said first storing step until at least one of the leaf files is full;

a reading step of reading a full one of the leaf files from the scratch memory space;

a second storing step of storing data portions of the read leaf file into a sorting memory space;

a sorting step of sorting the data portions in the sorting memory space into a respective sub-order based upon the indices of the data portions therein;

a step of selectively repeating said reading step, said second storing step and said sorting step until all the data portions of the read leaf file have been sorted;

an outputting step of outputting the sorted data portions of the read leaf file in their sub-order to a final output data stream; and a second repeating step of repeating at least said reading step, said second storing step, said sorting step and said outputting step until all the data portions of the input data set have been outputted in the respective sub-orders for all the full leaf files in leaf order to the final output data stream, where the data portions in their respective sub-orders for all the full leaf files in leaf order are in the defined overall order.

2. The method of claim 1, wherein each said data portion is a seismic data trace.

3. The method of claim 1, wherein a leaf file is full if and only if no more data portions are available to fall into the subject leaf file and all the leaf files having a lower leaf order than the subject leaf file in the B-Tree have already been sorted and output.

4. The method of claim 3, wherein there are no more data portions available to fall into the subject data file if an end of the input data set has been reached.

5. The method of claim 3, wherein said receiving step receives the data portions using a window of defined size.

6. The method of claim 5, wherein there are no more data portions available to fall into the subject data file if at least one of a group of conditions has been met, a first one of said conditions being that an end of the input data set has been reached and a second one of said conditions being that the window size for receiving the data portions has been exceeded.

7. The method of claim 1, wherein said first storing step stores each allocated data portion in a scratch disk memory.

8. The method of claim 1, wherein said reading step reads a full leaf file into the sorting memory space as soon as that leaf file becomes full.

9. The method of claim 1, wherein said reading step reads all the data portions of the full leaf file without random access processing.

10. The method of claim 9, wherein when the sorting memory space is insufficient to store all the data portions of one of the read leaf files, said second storing step stores different ones of the data portions of the one read leaf file in the sorting memory space each time said second storing step is repeated for the one read leaf file.

11. Apparatus for sorting large volumes of seismic data into a defined overall order, said apparatus comprising:

receiving means for receiving one of a plurality of data portions, where the plurality of data portions constitute an input data set, each data portion containing a plurality of seismic data and having associated therewith an index distinguishing the respective data portion from all other data portions in the input data set;

allocating means for allocating the received data portion to one of a plurality of leaf files of a B-Tree structure, the B-Tree structure defining a leaf order of the leaf files;

first storing means for storing the allocated data portion in a scratch memory space corresponding to the allocated leaf file;

control means for controlling said receiving means, said allocating means and said first storing means to repeat their operations until at least one of the leaf files is full;

reading means for reading a full one of the leaf files from the scratch memory space;

second storing means for storing data portions of the read leaf file into a sorting memory space;

sorting means for sorting the data portions in the sorting memory space into a respective sub-order based upon the indices of the data portions therein, said control means controlling said reading means, said second storing means and said sorting means to selectively repeat their operations until all the data portions of the read leaf file have been sorted; and output means for outputting the sorted data portions of the read leaf file in their sub-order to a final output data stream, said control means further controlling at least said reading means, said second storing means, said sorting means and said outputting means until all the data portions of the input data set have been outputted in the respective sub-orders for all the full leaf files in leaf order to the final output data stream, where the data portions in their respective sub-orders for all the full leaf files in leaf order are in the defined overall order.

12. The apparatus of claim 11, wherein each received data portion is a seismic data trace.

13. The apparatus of claim 11, wherein a leaf file is full if and only if no more data portions are available to fall into the subject leaf file and all the leaf files having a lower leaf order than the subject leaf file in the B-Tree have already been sorted and output.

14. The apparatus of claim 13, wherein there are no more data portions available to fall into the subject data file if an end of the input data set has been reached.

15. The apparatus of claim 13, wherein said receiving means receives the data portions using a window of defined size.

16. The apparatus of claim 15, wherein there are no more data portions available to fall into the subject data file if at least one of a group of conditions has been met, a first one of said conditions being that an end of the input data set has been reached and a second one of said conditions being that the window size for receiving the data portions has been exceeded.

17. The apparatus of claim 11, wherein said first storing means stores each allocated data portion in a scratch disk memory.

18. The apparatus of claim 11, wherein said reading step reads a full leaf file into the sorting memory space as soon as that leaf file becomes full.

19. The apparatus of claim 11, wherein said reading step reads all the data portions of the full leaf file without random access processing.

20. The apparatus of claim 19, wherein when the sorting memory space is insufficient to store all the data portions of one of the read leaf files, said second storing means stores different ones of the data portions of the one read leaf file in the sorting memory space each time said second storing means repeats its operation for the one read leaf file.

21. Apparatus for sorting large volumes of seismic data into a defined overall order, said apparatus comprising:

a buffer memory for receiving a plurality of data portions one at a time, where the plurality of data portions constitute an input data set, each data portion containing a plurality of seismic data and having associated therewith an index distinguishing the respective data portion from all other data portions in the input data set;

a processor for allocating each data portion in said buffer memory to one of a plurality of leaf files of a B-Tree structure, the B-Tree structure defining a leaf order of the leaf files;

an input/output device for storing each allocated data portion in said buffer memory into a scratch memory space corresponding to the allocated leaf file, wherein, in response to said processor determining that at least one of the leaf files is full, said input/output device reads a full one of the leaf files from the scratch memory space into said buffer memory without random access processing, said processor sorts the data portions of the one leaf file in said buffer memory into a respective sub-order based upon the indices of the respective data portions, and said buffer memory outputs the sorted data portions in their respective sub-order, said processor repeating this process until all of the leaf files have been ouptut in leaf order in a final data stream, where the data portions in their respective sub-orders for all the full leaf files in leaf order are in the defined overall order.

22. The apparatus of claim 21, wherein each data portion is a seismic data trace.

* * * * *